United States Patent [19]
Jacobsson

[11] Patent Number: 4,609,061
[45] Date of Patent: Sep. 2, 1986

[54] ENCLOSED SYSTEM FOR WEIGHING

[76] Inventor: Birger Jacobsson, Karlavägen 6, S-691 41 Karlskoga, Sweden

[21] Appl. No.: 722,328

[22] Filed: Apr. 12, 1985

[30] Foreign Application Priority Data

Apr. 16, 1984 [SE] Sweden .................................. 8402099

[51] Int. Cl.$^4$ ...................... G01G 21/02; G01G 21/28
[52] U.S. Cl. ..................................... 177/180; 177/179
[58] Field of Search ........................... 177/179, 180, 70

[56] References Cited

U.S. PATENT DOCUMENTS

| | | | |
|---|---|---|---|
| 3,848,688 | 11/1974 | Kloppenstein | 177/179 |
| 4,214,640 | 7/1980 | Di Rosa | 177/70 |
| 4,253,534 | 3/1981 | Hall et al. | 177/179 X |
| 4,285,412 | 8/1981 | Wirth | 177/179 |
| 4,416,343 | 11/1983 | Knothe et al. | 177/180 |

Primary Examiner—E. A. Goldberg
Assistant Examiner—Patrick W. Foster
Attorney, Agent, or Firm—Dennison, Meserole, Pollack & Scheiner

[57] ABSTRACT

The present invention relates to an enclosed system for weighing with vibrator-operated dosing means and enclosed balance (12). Between the dosing means and the balance (12) is an oil lock (6). The vibrator is entirely enclosed in a non-magnetic, sealed, metal casing (14). The weighing system is equipped with a microprocessor to enable weighing to be set in accordance with a recipe and optimization.

8 Claims, 2 Drawing Figures

ENCLOSED SYSTEM FOR WEIGHING

The present invention relates to a weighing system which is gastight and can therefore be used in premises which may contain flammable and explosive substances.

The need for better weighing systems is constantly increasing in industry, as well as the need for systems with great precision and speed, which can also be used for explosive and flammable substances.

Swedish published specification No. 420 949 describes a means for weighing a powdered material comprising two supply members, each operated by a vibrator. Each supply member is controlled by its own control means. The means is enclosed.

The present invention relates to a further development of the means described above, in order to further increase safety when using the device in connection with flammable and explosive substances.

Figure 1:
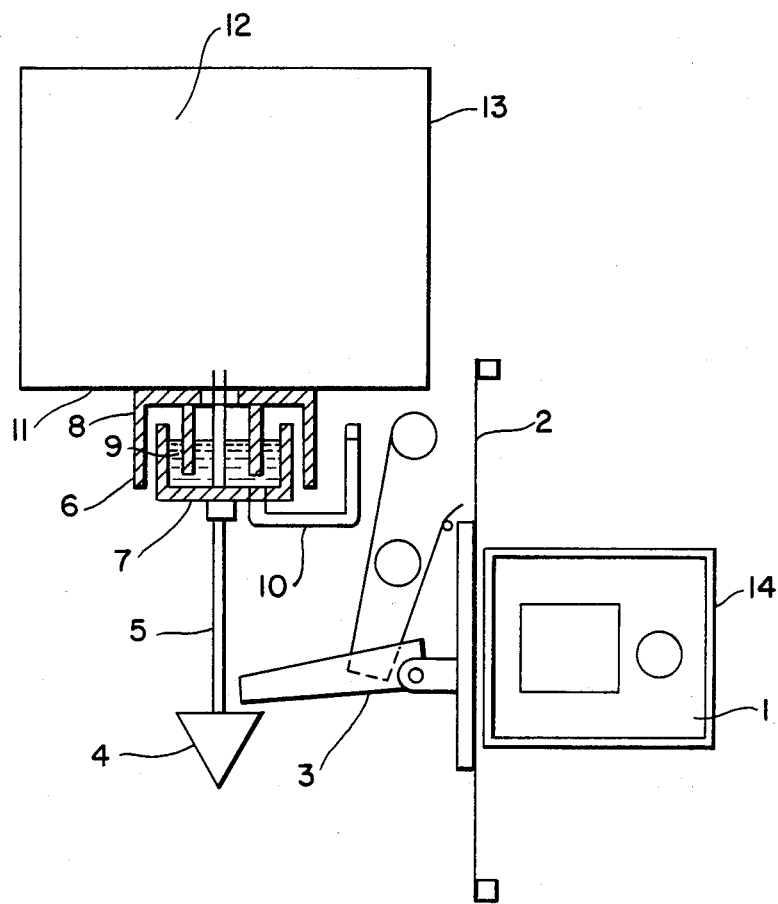
Figure 2:
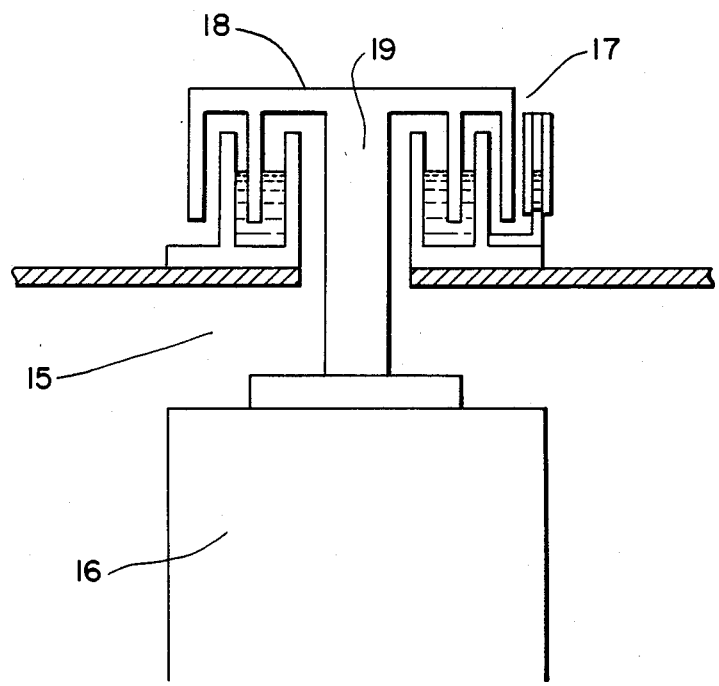

The system will be described in more detail with reference to the accompanying drawings in which, FIG. 1 shows the complete weighing system, and
FIG. 2 shows another embodiment of the system.

In the drawings, 1 designates an entirely enclosed vibrator, 2 a vibrator aligner, 3 a shaker, 4 a scoop and 5 a rod suspended in a balance 12. Between scoop 4 and balance 12 is an oil lock 6 having a lower part 7 and an upper part 8. The oil lock 6 contains oil 9 to a level ensuring that the lock is tight. The oil level can be checked through a transparent level tube 10, which may also be used for topping up with oil. The oil lock 6 is joined in gas-tight manner with the aid of a seal 11, to a gastight box 13, containing the balance 12.

The vibrator 1 is entirely enclosed by a non-magnetic metal casing 14 which is completely sealed. The metal casing 14 may be made of aluminium, stainless steel or brass, for instance. Vibrations to the aligner 2 are transmitted via force field.

FIG. 2 shows a system turned to face the other way, with a gas-tight box 15 containing a balance 16 placed below the oil lock 17. The oil lock is located in the outer atmosphere and the weighing unit in the inner atmosphere. The object to be weighed is placed on the upper surface 18 of the oil lock 17. The upper part 19 of the oil lock can move vertically within a distance of ca. 0.7 mm.

The weighing system according to FIG. 2 is particularly suitable for large weighing means.

The arrangements described provide an entirely dustproof system which can safely be used in connection with flammable and explosive substances. The system has been used, for instance, for weighing gunpowder and other explosive substances, and has functioned perfectly.

The weighing means is primarily intended for precision-dosing dry, powdered material.

The dosing is developed mainly with a view to the following branches of industry: metal, diamond, pharmaceutical, food, cosmetics, explosives and other industries using powdered material, tablets, pellets and so on.

The weighing system is equipped with a microprocessor (Z 80, 8 bit) for control purposes and to store recipes (50 in standard model, 250 in special model).

One finesse of the weighing means is the adaptive function which can be connected in if desired. With the function, after a certain programmed number of doses, an average of the dosage error is calculated, and the fine/fine dosing is adjusted accordingly. This is performed continuously in accordance with a "rolling" system.

Dosing is performed in four steps on two shakers in stages from course/fine, through fine to fine/fine.

The following special functions can also be programmed in: Optional stabilizing time, optional taring time, optional auto-taring interval, optional opening time, optional monitoring of the dosing time, optional quick-feed function, optional quick-dosing function (without stabilizing time), optional delay of the ready-signal from the balance after emptying, after-flow compensation and opto-insulated input/outputs (in basic model there are five programmable inputs/outputs and in the special model up to 21 programmable inputs/outputs).

There are considerable possibilities for synchronizing the balance with external equipment such as: robot handling, indexing tables, bag-filling, capsule handling, conveyor belts, press lines and wrappers, etc.

The special model may have five programmable function pushbuttons.

The accuracy and performance of the system are revealed in the following figures:

120 gram±0.001 gram, 4–6 dose/min.
1500 gram±0.01 gram, 6–10 dose/min.
3000 gram±0.1 gram, 4–6 dose/min.

What is claimed is:

1. In a dustproof weighing apparatus comprising:
 (a) a vibrator operated dosing means for dispensing a material to be weighed;
 (b) a receiver for holding the dispensed material while it is being weighed;
 (c) a balance encased in an enclosure for determining the weight of the material; and
 (d) means for transmitting a force between said receiver and said balance, said means passing through the enclosure of said balance;
 the improvement wherein said means comprises an oil lock placed at the point said means passes through said enclosure, said oil lock comprising a first upright cup means containing oil, a tube passing into said first cup means for determining oil level and adding oil, and a second inverted cup means including inner and outer substantially concentric cups, the wall of said inner cup being at least partially submerged in said oil,
 whereby vapors and dust cannot pass into said enclosure, and whereby the safety is increased in weighing flammable or explosive substances.

2. A dustproof system according to claim 1, characterised in that the vibrator (1) is entirely enclosed in a non-magnetic, sealed, metal casing (14).

3. A dustproof system for weighing according to claim 2, characterised in that the system is equipped with a microprocessor to enable weighing to be set in accordance with a recipe.

4. A dustproof system for weighing according to claim 2, characterised in that the system is wquipped with a microprocessor to enable weighing to be set in accordance with a recipe.

5. A dustproof system for weighing according to claim 3, characterised in that, with the aid of a microprocessor, via an adaptive control, the system itself can optimize a suitable level for fine/fine control of the after-flow compensation, and that this function continuously optimizes the correct level in accordance with a continuous rolling system.

6. A dustproof system for weighing according to claim 4, characterised in that, with the aid of a microprocessor, via an adaptive control, the system itself can optimize a suitable level for fine/fine control of the after-flow compensation, and that this function continuously optimizes the correct level in accordance with a continuous rolling system.

7. A dustproof system for weighing according to claim 1, characterised in that the system is equipped with a microprocessor to enable weighing to be set in accordance with a recipe.

8. A dustproof system for weighing according to claim 7, characterised in that, with the aid of a microprocessor, via an adaptive control, the system itself can optimize a suitable level for fine/fine control of the after-flow compensation, and that this function continuously optimizes the correct level in accordance with a continuous rolling system.

* * * * *